Oct. 30, 1928.
H. G. McCOMB
SHOCK ABSORBER
Filed March 11, 1926    2 Sheets-Sheet 1
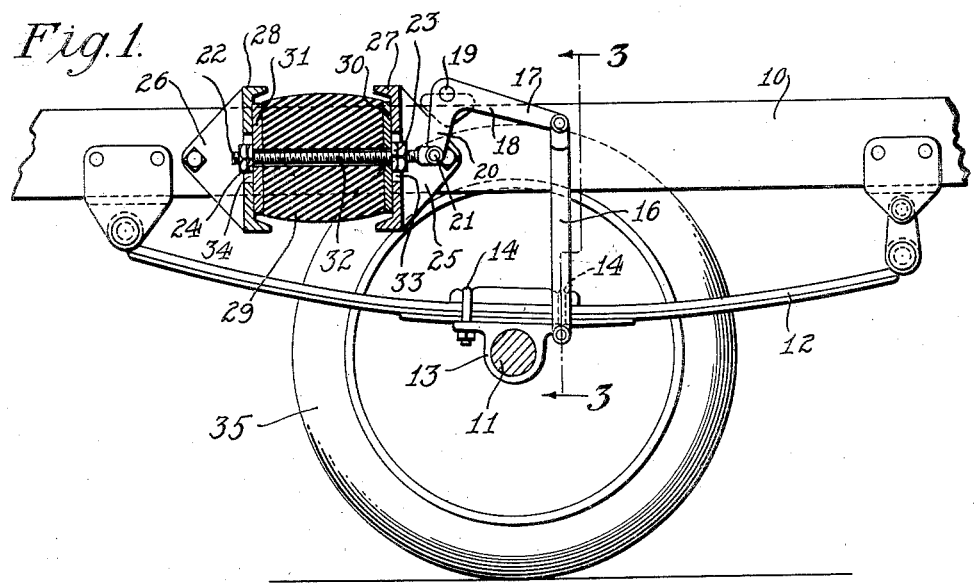
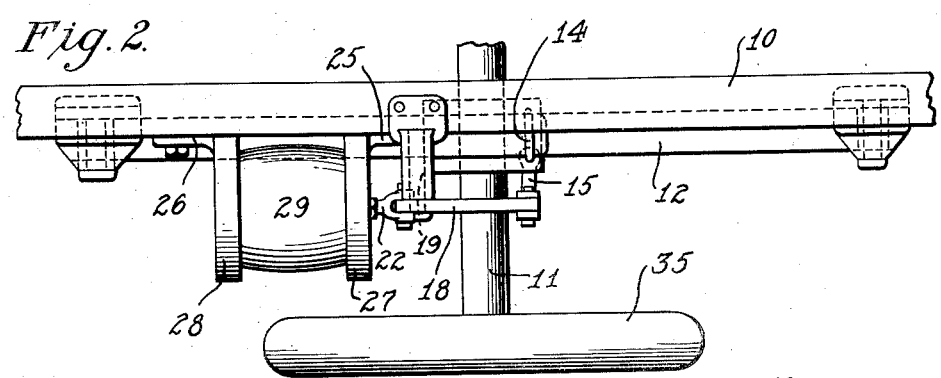
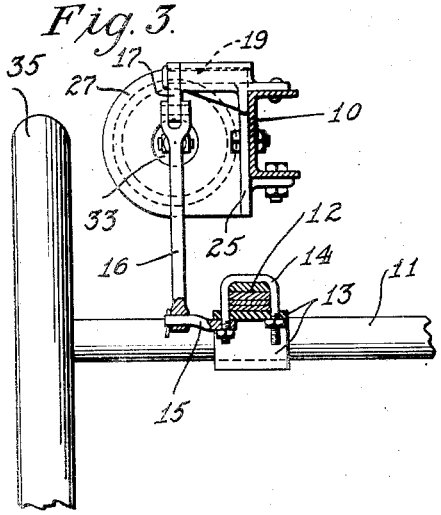
INVENTOR.
Henry G. McComb
BY
Ernest Hopkinson
ATTORNEY.

Oct. 30, 1928.

H. G. McCOMB

SHOCK ABSORBER

Filed March 11, 1926

INVENTOR.
Henry G. McComb
BY
Ernest L. Hopkinson
ATTORNEY.

Patented Oct. 30, 1928.

1,689,884

UNITED STATES PATENT OFFICE.

HENRY G. McCOMB, OF NEW YORK, N. Y., ASSIGNOR TO THE MECHANICAL RUBBER COMPANY, OF CLEVELAND, OHIO, A CORPORATION OF NEW JERSEY.

SHOCK ABSORBER.

Application filed March 11, 1926. Serial No. 93,876.

This invention relates to vehicles, but more particularly to body suspensions for the same, and has for its primary object to produce a simple economical and durable form of suspension which will provide greater comfort in riding and increase the life of the vehicle.

Further objects of the invention are to permit the use of lighter leaf springs or in other words leaf springs having less than the normal number of leaves to support the body or leaves of less thickness, to provide a simple and efficient form of snubber or shock absorber, and in general to provide an improved form of body suspension.

The chassis and body of practically all vehicles at the present time are supported on the axles by leaf springs of different types, but it has been found that in order to secure any considerable degree of comfort in riding it is necessary to use some form of snubber or shock absorber to eliminate the rebound action and vibration always produced by such springs. These snubbers are generally designed to offer little interference with the normal action of the springs, but to actively resist abnormal spring action and particularly the rebound which occurs immediately after a shock. These devices provide what may be termed a braking action on the springs, or in other words a building up of the internal friction of the spring. Probably the most effective devices of this character heretofore known have been those which operated upon the pneumatic or hydraulic principle but these have necessarily been expensive to produce, difficult to adjust and, on account of their size, limited to use on large and heavy cars.

The snubber or shock absorber forming the subject matter of the present invention primarily consists of a block or mass of rubber which yieldingly resists both the abnormal compression of the leaf spring and the rebound action of the same. This block of rubber also absorbs the vibrations of the spring and provides a high degree of comfort in riding. The absorption of shock and vibration also very materially lengthens the life of the vehicle.

The many other objects and advantages of the present invention will be better understood by reference to the following specification when considered in connection with the accompanying drawings illustrating a selected embodiment thereof, in which:

Fig. 1 is a side elevation partially in section of a rear suspension unit embodying the principles of the invention, the parts being in normal position.

Fig. 2 is a top plan view of the unit shown in Fig. 1.

Fig. 3 is a rear end view.

Fig. 4 is the same as Fig. 1 except that the parts are in the position of abnormal compression of the leaf spring.

Figure 5:
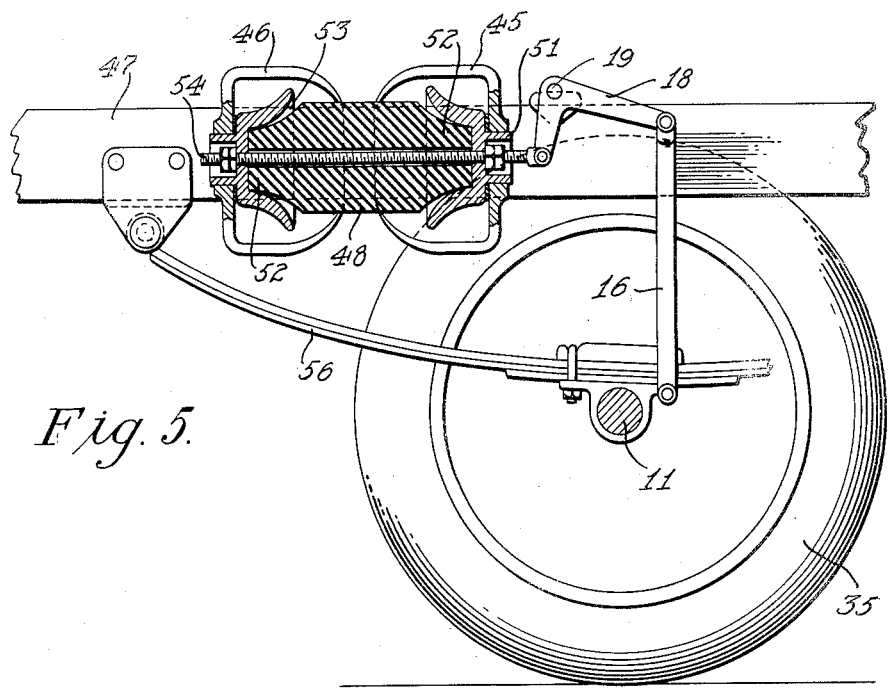
Fig. 5 is a side elevation partially in section of a slightly modified form of rear suspension units, the parts being in their normal position.

Referring to the drawing and particularly to Figs. 1–4 inclusive, the main frame 10 of the vehicle is connected to the axle 11 by a leaf spring 12 similar in character and method of mounting to that generally found in vehicles except that the number of leaves of the spring is less than would normally be required for such vehicle.

The leaf spring in the present embodiment is attached to the usual axle bearing or housing 13 by means of U-bolts 14—14. The rear U-bolt 14 is utilized to attach to the axle housing a laterally projecting bracket 15 and on the outer end portion of this bracket is pivotally mounted the lower extremity of a link 16. The bifurcated upper extremity of this link is pivotally connected to the rearwardly projecting arm 17 of a bell crank 18 which in turn is pivotally mounted on the frame 10 at 19. The arm 20 at the opposite end of the bell crank 18 has its outer extremity connected at 21 to the rear end of a bolt 22. Nuts 23 and 24 with corresponding lock nuts are placed upon this bolt 22 for a purpose which will be presently described.

Oppositely disposed brackets 25 and 26 are bolted or otherwise suitably attached to the side frame 10 and on these brackets are cup-shaped members 27 and 28, with their concave faces opposing each other. Between these cup shaped members is a block or mass 29 of rubber which may be of any suitable form but which in the present embodiment is substantially cylindrical. Plates 30 and 31 are interposed between the ends of the block 29 and the corresponding cup-shaped members 27 and 28 and these plates or discs are preferably vulcanized or otherwise attached to the block. A central perforation 32 extends through the block and the plates to permit the bolt 22 to pass freely therethrough. While this perforation is of larger diameter than the bolt for the purpose mentioned, it should be of smaller cross-sectional area than the nuts 23 and 24 so that such nuts cannot pass therethrough. These nuts 23 and 24 are preferably spaced so that they normally are in contact with the outer faces of the corresponding plates 30 and 31 as illustrated in Fig. 1. The cup shaped members 27 and 28 are provided with orifices 33 and 34 and these orifices are of sufficient cross-sectional area to permit the free passage of the bolt 22 and the nuts 23 and 24 therethrough.

In the operation of the vehicle the parts of the unit are normally in substantially the relative position shown in Fig. 1. When the wheel 35 passes over an obstruction the axle is caused to move upwardly toward the frame in the usual manner. This compresses the leaf spring 12 and raises the link 16. The upward movement of the link 16 causes the bell crank 18 to swing about its pivotal connection and to draw the bolt 22 to the right, as viewed in Fig. 1. This movement of the bolt 22 causes the nut 24 to force the plate 31 also to the right and compresses the block 29 against the cup shaped member 27 through the medium of the plate 30. The resistance of the block 29 to the compression of the leaf spring 12 increases as such compression progresses and the upward movement of the axle relative to the wheel is resisted both by the leaf spring and the rubber block.

The upward movement of the axle relative to the frame is almost immediately followed by the well-known rebound action in which the body tends to move away from the axle to a distance greater than normal. As soon as the normal relative position of the parts has been reached, the further separation of the frame and axle causes the link 16 to be drawn downwardly relative to the frame and this movement causes the bolt 22 to be pushed by the bell crank 18 to the left, as viewed in Fig. 1. The amount of this movement of the bolt to the left of its normal position depends upon the violence of the rebound action. This movement causes the nut 23 to act against the plate 30 and to compress the rubber block 29 against the cup shaped member 28 through the medium of the plate 31. The block 29 thus yieldingly resists any abnormal movement of the axle either toward or from the frame.

Figure 6:
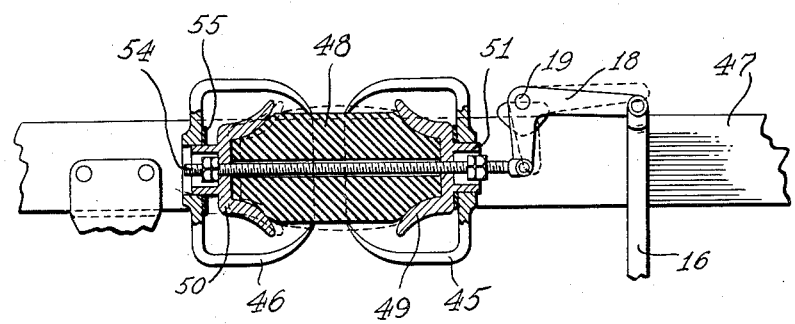
Fig. 6 is the same as Fig. 5 except that the parts are in the position of abnormal compression.

A modification of the embodiment shown in Fig. 1 is illustrated in Figs. 5 and 6. Oppositely disposed brackets as 45 and 46 are secured upon the main frame 47 and the rubber block 48 acts between cup shaped members 49 and 50, but these cup shaped members differ in one particular from the previous embodiment in that they are neither fixed to nor a part of the brackets, but each cup shaped member is provided with a short tubular projection as 51 which is slidable in a central bearing in the bracket. The reduced ends as 52 of the block fit the base of their corresponding cup shaped members, but the walls of such members are more flaring than the opposing portions of the block and thus an interval as 53 in Fig. 5 normally exists between the walls and the block. The primary object of thus forming the cup shaped members and block is to offer slight resistance to the initial relative movement of the axle and frame in either direction, but to cause this resistance to increase as the extent of movement is increased. Fig. 6 illustrates in solid lines the position of the parts and the form of the block when the block has reached the limit of the condition of relatively low resistance. Here it will be noted that only the reduced end portion of the block has been compressed. A further movement of the parts due to increased compression of the leaf spring is illustrated in dotted lines in Fig. 6. It will be seen that this further movement causes a compression and lateral bulging of the entire block of rubber and thus the resistance offered by the block is greatly increased.

Figure 7:
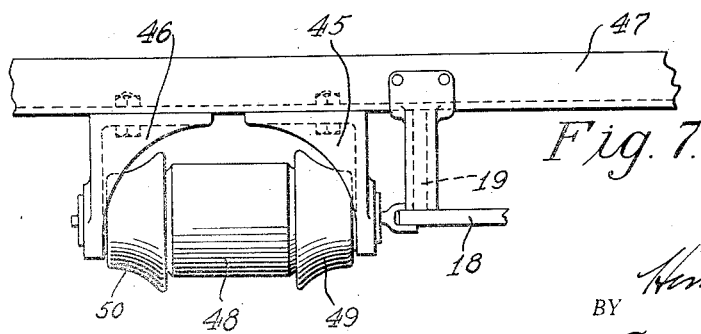
Fig. 7 is a partial top plan view of the embodiment of the invention shown in Fig. 5.

In the case of a rebound the operating bolt 54 is moved to the left in the same manner as the previous embodiment, causing the cup shaped member 50 to be forced against the bracket in the manner indicated for the member 49 in Fig. 6 and the member 49 is carried to the left by the nuts on this bolt. A rubber cushion as 55 is preferably interposed between each of the cups 49 and 50 and their respective brackets to prevent noise due to impact between these two metal parts. The modified form of the suspension shown in Figs. 5 and 6 is particularly advantageous for passenger cars and especially those of relatively light weight as it allows greater freedom of movement of the spring within a limited range and the full resistance of the block is only presented to movements of considerable magnitude. A variation in the amount of resistance offered by the block also occurs in the form of invention illustrated in Figs. 1–4 inclusive, but the initial resistance to movement is greater in this embodiment than in that of Figs. 5-7. The nuts on the bolts 22 and 55 may be adjusted to permit a certain amount of action of the leaf springs 12 and 56 before any compression of the block occurs.

The snubber or shock absorber forming the present invention is simple in construction, economical to produce and efficient in operation. The parts are strong and durable and if properly made will withstand a long period of use. There are no delicate parts to become broken and the necessary adjustments may be readily made. A rubber block of this character should last for the full life of the car, but if replacements of the blocks are necessary this may be done quickly and easily without the exercise of any skill or ingenuity.

The number of units would depend upon the points of suspension in the vehicle, and would generally correspond to the number of leaf springs previously employed. While it is advantageous to use a lighter leaf spring with this shock absorbing device, this is not necessary and the device may be readily incorporated in the regular spring suspension as are the various forms of snubbers and shock absorbers now on the market.

The form and arrangement of the various mechanical elements co-acting with the rubber block may be materially changed without departing from the spirit of the invention, and it should be distinctly understood that the embodiments shown and described are merely for the purpose of illustration.

Having thus described my invention, what I claim and desire to protect by Letters Patent is:

1. In a shock absorber, cup shaped members oppositely disposed, tubular projections on said cup shaped members, supporting means in which said projections slide, a block of resilient material having an orifice therethrough, said block extending between said members, a bolt extending through said orifice, and nuts on said bolt on opposite sides of said block, the nut on one side of said block acting to compress said block into the member on the opposite side thereof as said bolt is drawn toward this member, and a nut on the opposite side of the block acting to compress the block into the other member when said bolt is drawn in the opposite direction.

2. In a shock absorber, cup shaped members oppositely disposed and having flaring walls, a block of resilient material having an orifice therethrough, said block having tapering ends which engage said members, there being recesses between the flaring walls and the tapered ends, and a bolt extending through said orifice and free to move therein, and nuts on said bolt on opposite sides of said block, said nuts coacting with the corresponding faces of the block to cause said block to be compressed when said bolt is moved longitudinally in said block in either direction between the normal position.

Signed at New York, county and State of New York, this 10th day of March, 1926.

HENRY G. McCOMB.